(12) United States Patent
Zhu et al.

(10) Patent No.: US 12,737,902 B2
(45) Date of Patent: Sep. 15, 2026

(54) SYSTEM AND METHOD FOR ESTIMATING BOX SHAPE REPRESENTATION OF A GENERALLY CUBOIDAL OBJECT

(71) Applicant: Cognex Corporation, Natick, MA (US)

(72) Inventors: Hongwei Zhu, Natick, MA (US); Daniel Moreno, Northbridge, MA (US); Ali M. Zadeh, Greenville, SC (US); Martin Schaufuss, Erfurt (DE)

(73) Assignee: Cognex Corporation, Natick, MA (US)

( * ) Notice: Subject to any disclaimer, the term of this patent is extended or adjusted under 35 U.S.C. 154(b) by 275 days.

(21) Appl. No.: 18/732,059

(22) Filed: Jun. 3, 2024

(65) Prior Publication Data

US 2024/0404091 A1 Dec. 5, 2024

Related U.S. Application Data

(60) Provisional application No. 63/470,548, filed on Jun. 2, 2023.

(51) Int. Cl.
*G06T 7/50* (2017.01)

(52) U.S. Cl.
CPC ...... *G06T 7/50* (2017.01); *G06T 2207/10028* (2013.01); *G06T 2207/20016* (2013.01)

(58) Field of Classification Search
CPC ............. G06T 7/50; G06T 2207/10028; G06T 2207/20016; G06T 7/64;

(Continued)

(56) References Cited

U.S. PATENT DOCUMENTS 11,335,021 B1 5/2022 Vaidya
11,341,350 B2 5/2022 Peruch (Continued)

FOREIGN PATENT DOCUMENTS

EP 3751518 12/2020

OTHER PUBLICATIONS

Jung, Woonhyung, Janghun Hyeon, and Nakju Doh. “Robust cuboid modeling from noisy and incomplete 3D point clouds using Gaussian mixture model.” Remote Sensing 14.19 (2022): 5035. https://www.mdpi.com/2072-4292/14/19/5035/pdf.

(Continued)

*Primary Examiner* — Charlotte M Baker
(74) *Attorney, Agent, or Firm* — Loginov & Associates, PLLC; William A. Loginov

(57) ABSTRACT

A system and method for estimating a 3D box model of a generally cuboidal 3D object imaged by 3D vision system, which provides a 3D image having a set of 3D points representing surfaces of the cuboidal 3D object to a processor is provided. An input process provides an approximate box as a region of interest (ROI), to the processor, the ROI defining a search volume within the 3D image. An identification process identifies the 3D points that are within the search volume. A coarse estimation process estimates 3D box dimensions that approximate a box shape of the cuboidal object based upon the identified 3D points. A refinement process refines the coarse box shape by processing the 3D points based on the 3D box dimensions that correspond to each of a plurality of imaged faces of the cuboidal object to derive an estimated result for the cuboidal object.

20 Claims, 14 Drawing Sheets

(58) Field of Classification Search
CPC . G06T 2207/20068; G06T 7/12; G06T 7/149; G06T 7/11; G06V 2201/06; G06V 10/25; G06V 10/50; G06V 20/653
USPC .......................................................... 382/154
See application file for complete search history.

(56) References Cited

U.S. PATENT DOCUMENTS

| | | | | |
|---|---|---|---|---|
| 2013/0329013 | A1 | 12/2013 | Metois | |
| 2014/0009601 | A1* | 1/2014 | Cho | G01N 21/9501 348/126 |
| 2015/0042791 | A1 | 2/2015 | Metois | |
| 2018/0143003 | A1 | 5/2018 | Clayton | |
| 2018/0364045 | A1* | 12/2018 | Williams | G01S 17/88 |
| 2020/0394812 | A1 | 12/2020 | Carey | |

OTHER PUBLICATIONS

M. Mishima et al., "RGB-D SLAM based Incremental Cuboid Modeling", https://openaccess.thecvf.com/content_ECCVW_2018/papers/11129/Mishima_RGB-D_SLAM_based_Incremental_Cuboid_Modeling_ECCVW_2018_paper.pdf, 15 pages, 2018.

M. Ramamonjisoa et al., "MonteBoxFinder: Detecting and Filtering Primitives to Fit a Noisy Point Cloud", https://www.ecva.net/papers/eccv_2022/papers_ECCV/papers/136880160.pdf, 17 pages, 2022.

Matlab, "cuboid fit (RANSAC)", https://www.mathworks.com/matlabcentral/fileexchange/65168-cuboid-fit-ransac, 4 pages, 2021.

Matlab, "fit cuboid over point cloud", https://www.mathworks.com/help/lidar/ref/pcfitcuboid.html, 6 pages, 2021.

Researchgate, https://www.researchgate.net/figure/a-Point-cloud-data-and-normal-orientation-for-b-PCA-c-RANSAC-and-d-DetRPCA_fig6_273060527, 9 pages, Mar. 2015.

Springer Link, "Fitting Cuboids from the Unstructured 3D Point Cloud", https://link.springer.com/chapter/10.1007/978-3-030-34110-7_16, 22 pages, 2019.

Leo Marco et al: "Robust estimation of Object Dimensions and External Defect Detection with a Low-Cost Sensor", Journal of Nondestructive Evaluation, New York, US, vol. 36, No. 1, 2017, pp. 1-16, DOI: 10.1007/s10921-017-0395-7.

* cited by examiner

SYSTEM AND METHOD FOR ESTIMATING BOX SHAPE REPRESENTATION OF A GENERALLY CUBOIDAL OBJECT

RELATED APPLICATION

This application claims the benefit of U.S. Provisional Application Ser. No. 63/470,548, entitled SYSTEM AND METHOD FOR ESTIMATING BOX SHAPE REPRESENTATION OF A GENERALLY CUBOIDAL OBJECT, filed Jun. 2, 2023, the teachings of which are expressly incorporated herein by reference.

FIELD OF THE INVENTION

This invention relates to vision systems that generate three-dimensional (3D) representations for objects in a scene, and more particularly to 3D vision systems adapted to operate on a moving line of differing-sized, generally rectangular objects.

BACKGROUND OF THE INVENTION

Machine vision systems (also termed herein, “vision systems”) that perform measurement, inspection, and alignment of objects and/or decoding of symbology (e.g. bar codes—also termed “ID Codes”) are used in a wide range of applications and industries. These systems are based around the use of an image sensor, which acquires images (typically grayscale or color, and in one, two or three dimensions) of the subject or object, and processes these acquired images using an on-board or interconnected vision system processor. The processor generally includes both processing hardware and non-transitory computer-readable program instructions that perform one or more vision system processes to generate a desired output based upon the image’s processed information. This image information is typically provided within an array of image pixels each having various colors and/or intensities.

As described above, one or more vision system camera(s) can be arranged acquire two-dimensional (2D) or three-dimensional (3D) images of objects in an imaged scene. 2D images are typically characterized as pixels with an x and y component within an overall N×M image array (often defined by the pixel array of the camera image sensor). Where images are acquired in 3D, there is a height or z-axis component, in addition to the x and y components. 3D image data can be acquired using a variety of mechanisms/techniques, including triangulation of stereoscopic cameras, LiDAR, time-of-flight sensors and (e.g.) laser displacement profiling.

A common use for vision systems is to track and sort objects moving along a line (e.g. a conveyor) in manufacturing and logistics operations. The vision system camera(s) can be positioned over the line at an appropriate viewing angle to acquire any expected IDs on respective objects as they each move through the field of view. The focal distance of the reader with respect to the object can vary, depending on the placement of the reader with respect to the line and the size of the object.

In various logistics tasks, determining the size and relative shape, including the maximum thickness or height, of parcels (e.g. relatively cuboidal/rectangular-sided boxes, jiffy mailers, polybags, envelopes, etc.) on a conveyor is desirable. Such dimensions are used to provide proper handling as they are sent down the conveyor to further processes.

SUMMARY OF THE INVENTION

This invention overcomes disadvantages of the prior art by providing a system and method of estimating a robust and very accurate three-dimensional (3D) cuboidal object (box) shape compared to an approximation of box dimensions that are either provided by the user or estimated using (e.g.) a 3D Blob tool. The system and method effectively computes a representation of the underlying 3D box shape conveyed by an acquired 3D point cloud and adaptively overcomes inaccuracy in the pose and size of the box in the point cloud data. It provides an ideal box shape, excluding any defects. The results of the system and method can be used for both rule-based and learning-based box damage inspection. The system and method provide a more accurate and robust estimate of the underlying geometric cuboidal shape of a box, regardless of whether it is deformed (e.g., by defects, such as a bulge, dent, open flap) or has flag labels/tapes inappropriately installed (e.g., hanging outside the boundary of the top surface). More particularly, the system and method provide an effective technique for finding and dimensioning a cuboidal object/box in the presence of a cuboid deformity, such a bulges, open flaps, dents, etc. that would otherwise violate the cuboid assumption of the shape because (a) sides are not planes and (b) corners and edges may have damage. The present technique avoids the deficiencies in prior techniques in that it finds the rough cuboid (as best determined in a potentially deformed shape) using any applicable technique, and then employing the determined, coarse cuboid as an input to refine the surface intersection estimates using an approach that considers a cluster of points from each (roughly) intersecting surface selected. This refinement technique largely avoids the limitation resulting from an assumption that a surface corresponds to a plane. Thus, the present technique yields improved results on a range of deformed cuboidal objects/boxes, while also accurately estimating a shape of non-deformed boxes.

In an illustrative embodiment, a system and method for estimating a 3D box model of a generally cuboidal object imaged by a 3D vision system, that can provide a 3D image having 3D points representing imaged surfaces of the cuboidal object to a processor is provided. An input process can provide, to the processor, an approximate box as a region of interest (ROI) defining a search volume within the 3D image. An identification process can identify the 3D points that are within the search volume, and a coarse estimation process can estimate, based on the identified 3D points, 3D box dimensions that approximate a coarse box shape of the cuboidal object. A refinement process can refine the coarse box shape to derive an estimated result for the 3D box model by, for the imaged surface (of the set of imaged surfaces): determining a projection two-dimensional (2D) height map, and defining at least one of face pixels and/or non-face pixels associated with the imaged surface; identifying bounding positions that define a face of the coarse box shape based upon a distribution of the at least one of face pixels or non-face pixels; refining the face of the coarse box shape by determining an associated face thickness; and deriving the estimated result for the 3D box model including the refined face. Illustratively, the coarse estimation process can be adapted to estimate a thickness of each of a plurality of imaged faces corresponding to the 3D box dimensions by analyzing statistics of a distribution of the 3D points, based on the 3D box dimensions that correspond to each of the plurality of imaged faces. The statistics can be based upon a 3D point density distribution along a normal direction to each of the plurality of imaged faces. The statistics can be further based upon a histogram of face point distances relative to each of the plurality of imaged faces, and the thickness can be a predetermined distance on each of opposing sides of the histogram peak position. The histogram peak position can be a location at which the 3D point density distribution is a maximum. The refinement process can be adapted to identify boundary 3D points, which correspond to the 3D points, and are located between adjacent faces of the plurality of imaged faces. The refinement process can be adapted to compute a face plane for each of the plurality of imaged faces by fitting a 3D robust plane using the identified boundary 3D points. The face plane can be computed based upon the thickness estimates of neighboring imaged faces. Illustratively, a result process can estimate the 3D box model based upon the 3D box dimensions that correspond to a plurality of imaged faces with face position and rotation correction. The result process can correct rotation based upon identification of a face in the estimated result that defines a tilt angle that is greater than a preset threshold angle. Illustratively, the cuboidal object can be moved into a field of view of the 3D vision system by a conveyor that communicates with the processor.

In an illustrative embodiment, a non-transitory computer readable medium having program instructions that, when executed, cause at least one processor to receive, by the at least one processor, a 3D image of a generally cuboidal object. The 3D image can have 3D points representing imaged surfaces of the cuboidal object. The processor can be caused to receive, a region of interest (ROI), in which the ROI defines a search volume within the 3D image. The processor can be caused to identify the 3D points that are within the search volume, and to estimate 3D box dimensions that approximate a coarse box shape of the cuboidal object based upon the identified 3D points. The processor can be caused to refine the coarse box shape by determining a projection two-dimensional (2D) height map associated with an imaged surface of the imaged surfaces, and defining at least one of face pixels or non-face pixels associated with the imaged surface, identify bounding positions that define a face of the coarse box shape based upon a distribution of the at least one of face pixels or non-face pixels, and refine the face of the coarse box shape by determining an associated face thickness. The processor can be caused to derive an estimated result for the 3D box model that includes the refined face. The non-transitory computer readable medium having program instructions that, when executed, can further cause the at least one processor to perform the various steps described above.

BRIEF DESCRIPTION OF THE DRAWINGS

The invention description below refers to the accompanying drawings, of which.

DETAILED DESCRIPTION

As noted above, determining the size and relative shape (e.g., including the maximum thickness or height) of parcels on a conveyor is desirable within various logistics processes. Such dimensions are used to provide proper handling as they are sent down the conveyor to further processes.

However, in performing the inspection of a cuboidal shaped carton box, the imagers employed in positions above the box inspection area on a conveyor may generate somewhat noisy signals and/or otherwise fail to accurately acquire image data. For example, a 3D point cloud image of the physical box may fail to detect, or generate inaccurate data when the box is damaged/deformed in any of its visible faces (top, front, back, left and right faces of the box). To this end, it is highly desirable to provide and employ an ideal 3D box shape of representing the underlying model of the object and use it as reference for measuring face deformation and type. Existing image processing and analysis techniques, such as 3D Blob tools, identify the 3D points that most probably belong to the object and compute a bounding box for them. However, a bounding box may not always provide a good approximation of the ideal physical box shape excluding any deformation defects. That is, the bounding box is delineated to be sufficiently large to enclose all points of the imaged object, including those of bulges and open flaps. In such instances, direct use of the bounding box proves unsuitable since the bounding box only provides a coarse estimation of the object, rather than precise and accurate modeling of it. Existing techniques refine the top face of the bounding box obtained from the 3D Blob tool by identifying and locating the points located on the four corners of the top face of the object. However, the results of this process may not yield accurate information if the blob bounding box is attempting to dimension a box with surfaces that do not conform to planes, for example when the box includes defects, including, but not limited to, a bulge, dent, open flap, or where flag labels/tapes are inappropriately installed (e.g., hanging outside the boundary of the top surface). A more robust technique is, thus, desirable.

I. System Overview

Figure 1:
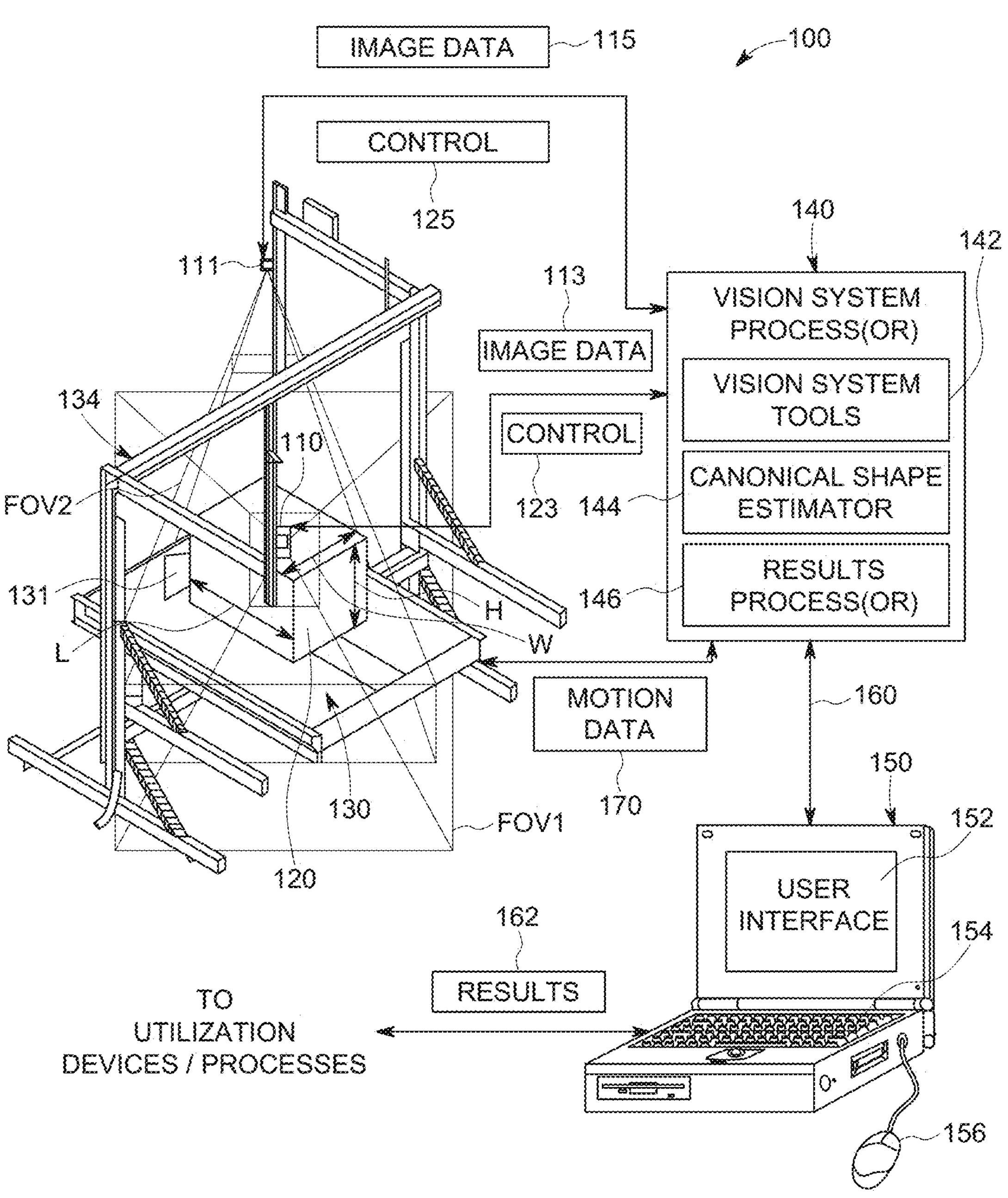
FIG. 1 is a diagram of an inspection area of an exemplary conveyor line with a pair of overlying cameras to generate (e.g.) 3D point clouds of the imaged scene, an interconnected vision system, and a processor for estimating a relative canonical shape of cuboidal objects within the scene, according to an exemplary embodiment.

FIG. 1 shows an overview of an arrangement 100 in which one or more vision system cameras 110 and 111 (also each termed simply "camera" or "sensor") acquire 3D image data 113 and 115, respectively, of generally cuboidal objects (e.g. packages of various sizes and shapes, such as box 120) as they pass through an inspection station on an exemplary, moving conveyor 130. The camera arrangement can be any assembly that acquires 3D images of objects including, but not limited to, stereo cameras (or, as depicted, two spaced-apart cameras 110, 111 with overlapping FOVs—FOV1 and FOV2, respectively), time-of-flight cameras, LiDAR, ultrasonic range-finding cameras and laser-displacement sensors. A single camera or array of cameras (as shown) can be provided and the terms "camera" and/or "camera assembly" can refer to one or more cameras that acquire image(s) in a manner that generates 3D image data of the scene. The depicted camera assembly 110, 111 is shown mounted on a framework 134 overlying the surface of the conveyor 130 in the manner of a checkpoint or inspection station that images the flowing objects (e.g. packages) as they pass by. The objects can remain in motion or stop momentarily for imaging, depending upon the operating speed of the conveyor and acquisition time for camera image sensor and related electronics (depending, in part, upon frame rate and aperture settings). A non-limiting example of a vision system for use in this exemplary embodiment is the 3D-A1000 dimensioning system, and associated processing software that generates and analyzes 3D point cloud data from an imaged scene, available from Cognex Corporation of Natick, MA.

The camera assembly 110, 111 includes an internal (to its/their housing(s)) and/or external vision system process (or) that receives image data 113, 115 from the respective cameras 110, 111, and performs various vision system tasks upon the data in accordance with the system and method herein. The processor 140 can provide control information 123, 125 to the cameras 110, 111, including but not limited to acquisition trigger signals, focus information, etc., as should be clear to those of skill. The process(or) 140 provides underlying processes/processors or functional modules, including a set of vision system tools 142, which can comprise a variety of standard and custom tools that identify and analyze features in image data, including, but not limited to, edge detectors, blob tools, pattern recognition tools, deep learning networks, etc. The vision system process(or) 140 can further include a canonical shape estimator 144 (and associated processes/processors) in accordance with the present system and method. This process(or) 144 performs various analysis and measurement tasks on features identified on the 3D image data so as to determine the side and orientation of objects on the conveyor—as described in detail below. A results process(or) 146 is associated with the canonical shape estimator 144, and can be part of the overall vision system processor, or can be provided on a separate computing device 150, such as a server (e.g. cloud-based or local), PC, laptop, tablet and/or smartphone. The computing device 150 is depicted (by way of non-limiting example) with a conventional display or touchscreen 152, keyboard 154 and mouse 156, which collectively provide a graphical user interface (GUI) functionality. A variety of user interface devices and/or form factors can be provided in alternate implementations of the device 150. The GUI can be driven, in part, by a web browser application, which resides over a device operating system and displays web pages with control and data information from the process(or) 140, and can be implemented in a manner clear to those of skill.

Note that the process(or) 140 can reside fully or partially on-board the housing of the camera 110, and/or 111, and various process modules 142, 144 and 144 can be instantiated entirely or partially in either the on-board process (system and interface functions can be instantiated on the on-board process(or) 140, and the computing device 150 can be employed primarily for training, monitoring and related operations with interface web pages (e.g. HTML) generated by the on-board-process(or) 140 and transmitted to the computing device via a wired or wireless network link 160. Alternatively, all or part of the process(or) 140 can reside in the computing device 150. Thus, in various embodiments, image processing can be entirely, or substantially entirely carried out with a remote computing device (150)—hence the processor 140 and its functional modules/processes is/are instantiated within the computing device 150. The link 160 from the computing device 150 and/or processor 140 can provide vision system results 162 to a downstream utilization device or process. Such device/process can use results 162 to handle objects/packages—for example gating the conveyor 130 to direct objects/packages to differing destinations based on package size.

Figure 2:
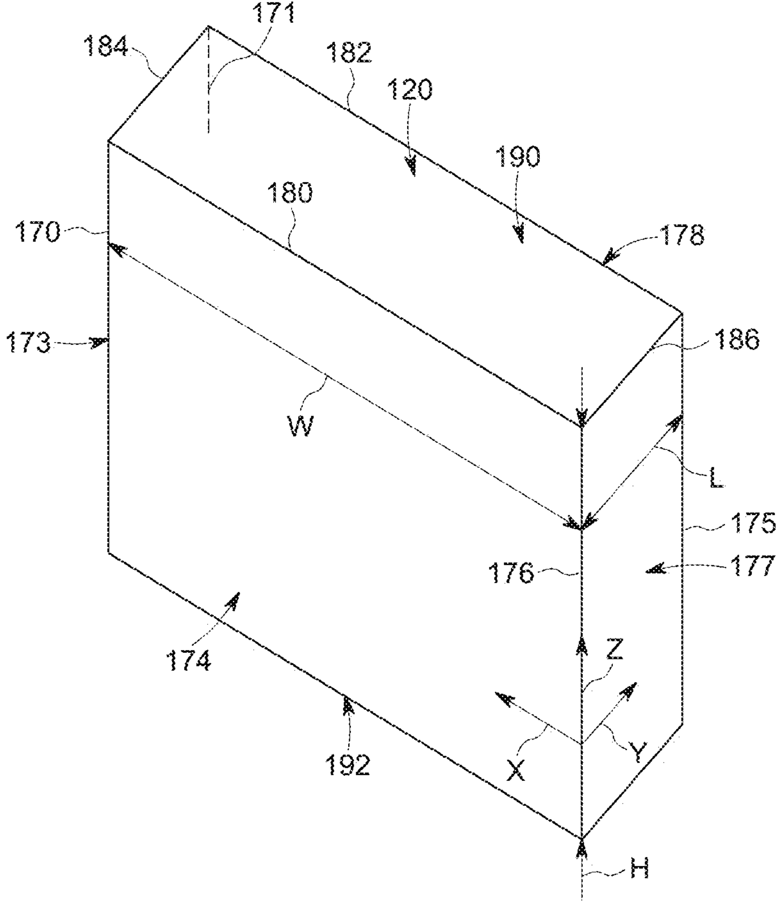
FIG. 2 is a perspective view of an exemplary, cuboidal object/package 120 shown in FIG. 1, depicting local coordinate axes and dimensions.

With further reference to FIG. 2, dimensions of the cuboidal object/box 120 are represented by width W, length L and height H. These dimensions can be characterized in terms of a local X, Y and Z coordinate system with respect to the individual object/package. The axes can follow the edges/corners of the object's generally cuboidal shape as shown. Edges can be located in acquired 3D image data (e.g. 3D point cloud) using vision tools 142, that can include 3D edge detectors and other conventional or specialized tool—such as those provided in the above-described 3D-A1000 system. The edges, and intersecting corners thereof, can be used to define each exposed/visible face of the box 120 in the imaged scene. That is, the side edges 170, 171 (shown partially in phantom), 175 and 176 variously define sides 173, 174, 177 and 178, along with the top edges 180, 182, 184 and 186, which also define the top face 190. The bottom face 192 is not exposed in this exemplary embodiment.

Note also that the terms "top", "side(s)", "left", "right", "front", and "back" herein refer to the relative orientations of a box within a scene in which the bottom confronts the supporting surface; the top is opposite the supporting surface (and typically parallel thereto); the side(s) separate the top and bottom and approximately perpendicular to each; and the left, right, front and back comprise the relative sides. As described below, these directional/orientational terms are only by way of example.

The conveyor 130 can include various sensors, such as a presence detector to notify the process(or) 140 that an object has passed into the field(s) of view FOV1 and FOV2 of the camera assembly, and thereby trigger image acquisition by the camera assembly with appropriate timing. Additionally, the conveyor 130 can optionally include an encoder or other motion-measurement device that transmits general speed and/or motion data/information 170 to the process(or) 140 that can be used to control operations in a manner clear to those of skill.

Note that the above-described arrangement 100 is only exemplary of a wide variety of possible environments for acquiring 3D image data of a cuboidal object. In alternate arrangements, a greater or fewer number of cameras can be used in the assembly for acquiring 3D image data for the object. Likewise, the object can be presented to the camera assembly in a variety of manners, including a moving conveyer (as shown), a stationary stage, and/or a moving camera frame that passes over the object (e.g., via a robotic assembly). Also, while the bottom face of the object/box may be obscured by a supporting surface, in alternate arrangements, this procedure can be adapted to implementations in which the bottom face is visible—for example a suspended object or transparent supporting surface.

II. Operating Procedure

A. General Considerations

In overview, the arrangement 100 of FIG. 1 generates 3D point cloud (or another image data representation) of the cuboidal object (box 120). This data is provided to the vision system process(or) 140. The canonical shape estimator 144, of the operating procedure herein, receives the 3D point cloud data and provides a data set that approximates the physical box cuboid shape as if it had no deformation defects. The input box can be configured to indicate either a coarse box approximation of the object or a region of interest (ROI) containing the points of the object. Where an ROI is provided, the process(or) estimates a coarse bounding box from the given points within the ROI, e.g., by running a 3D Blob tool from vision system tools 142.

By way of useful background, an effective system and method for determining cuboidal object shape using a blob tool is described in commonly assigned U.S. Pat. No. 11,335,021, entitled SYSTEM AND METHOD FOR REFINING DIMENSIONS OF A GENERALLY CUBOIDAL 3D OBJECT IMAGED BY 3D VISION SYSTEM AND CONTROLS FOR THE SAME, issued May 17, 2022, the teachings of which are incorporated herein by reference.

The canonical shape estimator estimates the 3D box shape using a coarse 3D box, which is an approximate representation (e.g., using the bounding box of the Blob tool result) of a cuboid shaped carton box under damage inspection. The procedure herein processes the points within the input box ROI of a point cloud acquired by the cameras 110, 111 imaging the object. The operating procedure, thus, provides a box result with better accuracy and robustness than that of the starting coarse box. It can minimize the impact from the adversary factors (e.g., noise, sensor resolution limitation, defects-caused object deformation) that cause inaccuracy in the coarse box.

Conceptually, the procedure operates using a general assumption that, within a box face, the boundary/edge region is less likely to be damaged than other regions of the box because the boundary/edge region approximating a folded edge is physically stronger and less likely to be damaged. By taking advantage of this assumption, the operational procedure estimates a 3D box shape by utilizing the boundary surface points on each of the box faces. The procedure further assumes that the visible faces (e.g. imaged top, and sides) provide a reasonable distribution of points in the acquired 3D point cloud data. Thus, point clouds are expected to be captured and merged from multiple views, for which the cameras/image sensors are installed, to ensure that each exposed face (e.g. typically except the bottom) of a physical box can be imaged by at least one sensor and/or one view.

B. Cuboidal Object Shape Estimation

Figure 3:
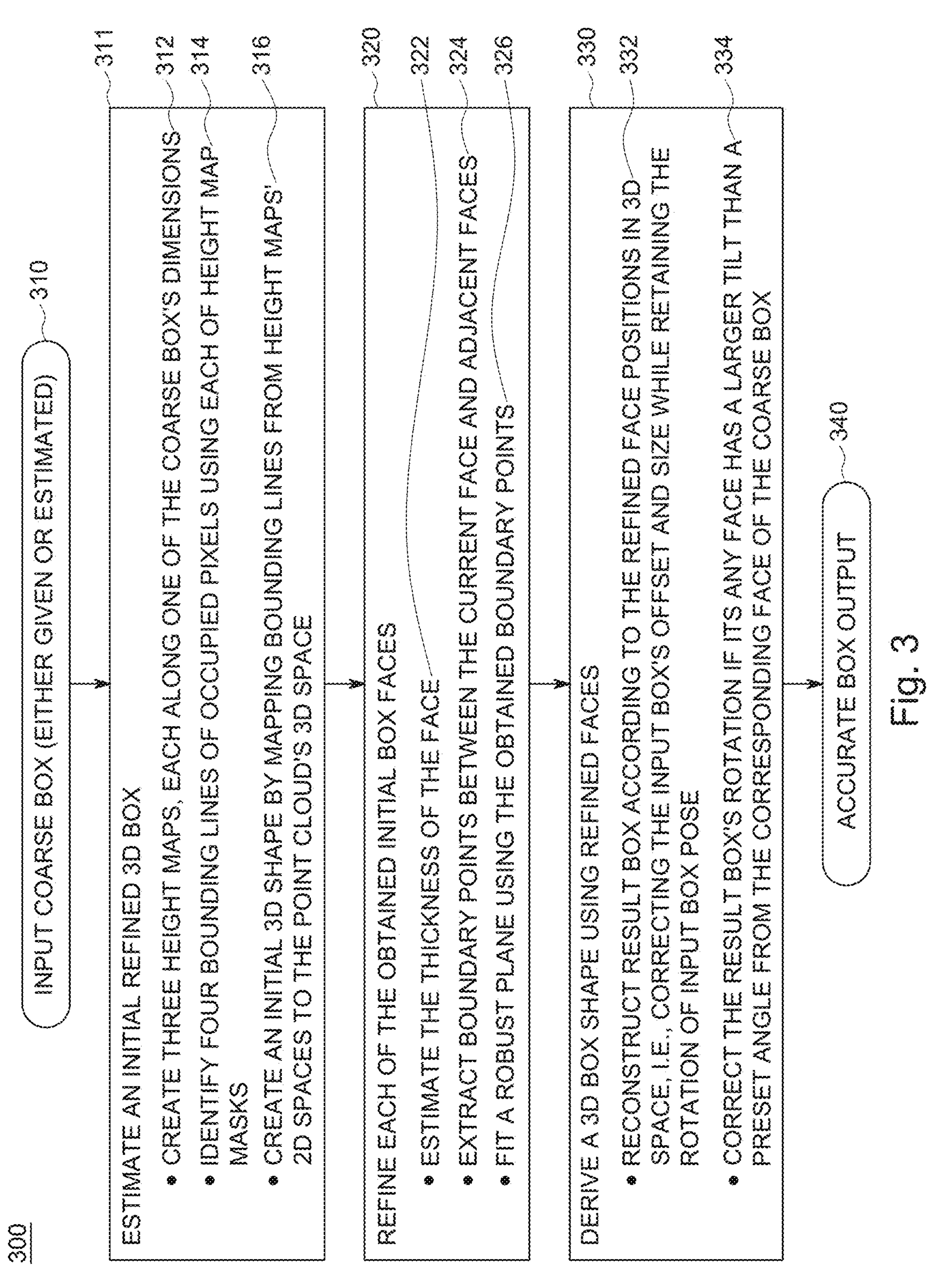
FIG. 3 is a flow diagram of a procedure for estimating a cuboidal object imaged in accordance with the exemplary arrangement of FIG. 1.
Figure 3A:
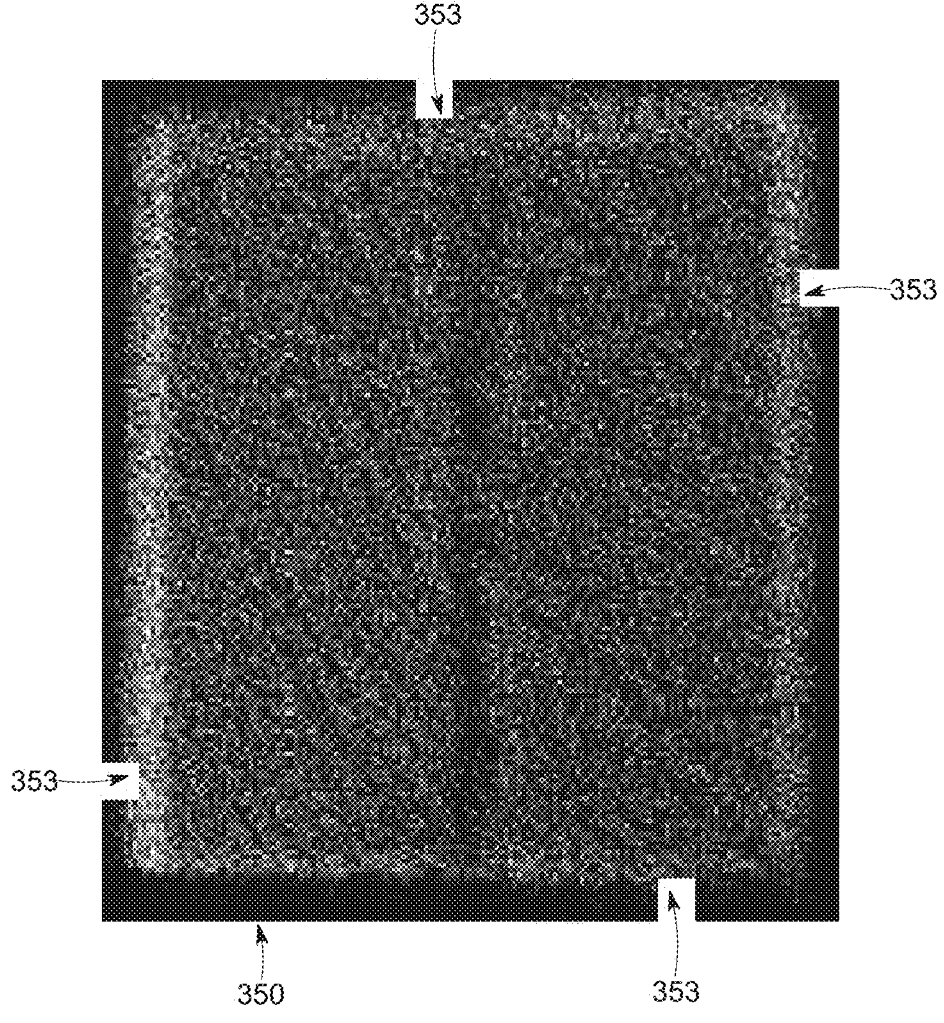
FIG. 3A is a diagram showing a display of a (coarse box) point cloud acquired by the arrangement of FIG. 1 for the top face of an exemplary cuboidal object.
Figure 3B:
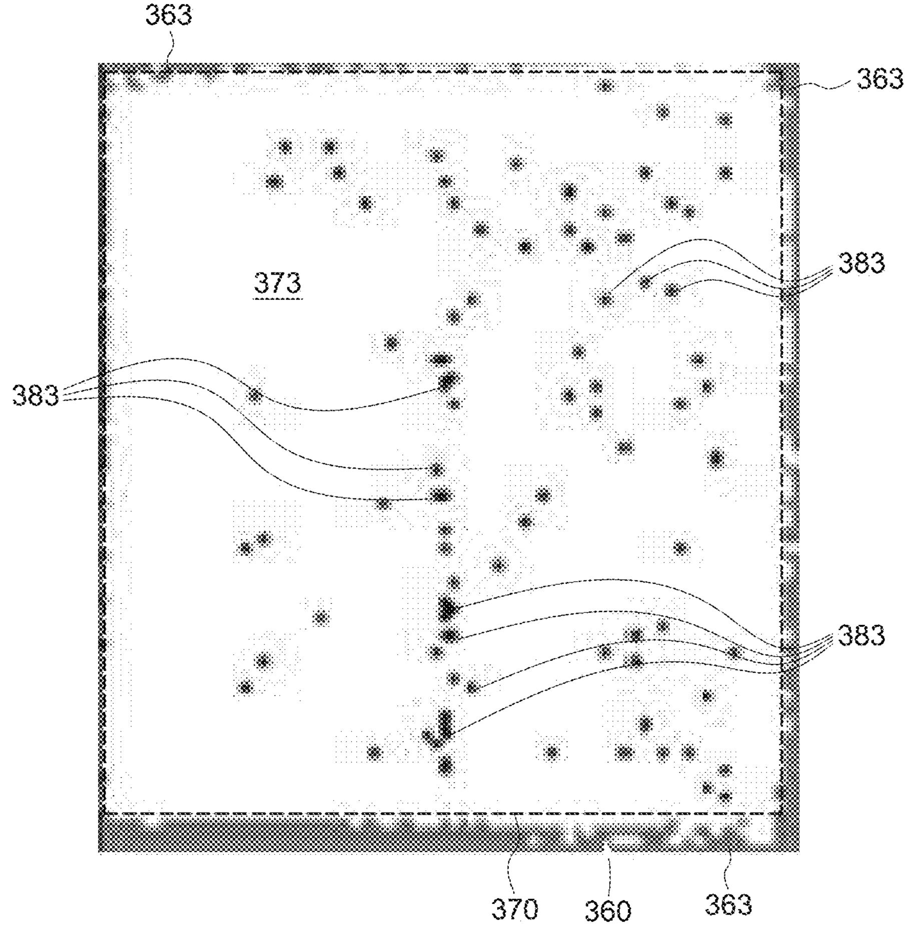
FIG. 3B is a diagram showing a display of a 2D height map mask for the coarse box point cloud of FIG. 3A.
Figure 3C:
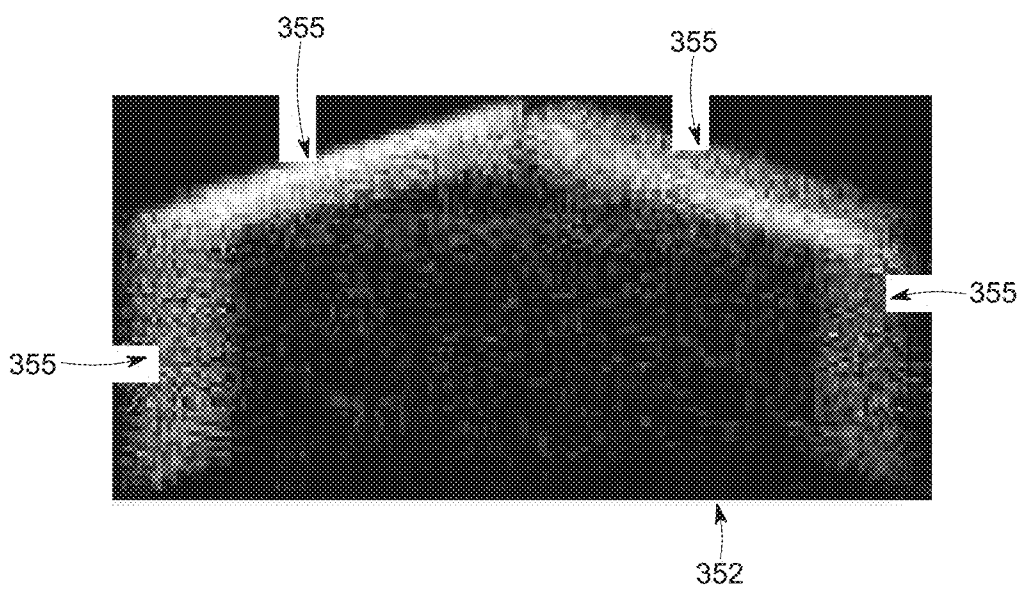
FIG. 3C is a diagram showing a display of a (coarse box) point cloud acquired by the arrangement of FIG. 1 for the front face of an exemplary cuboidal object.
Figure 3D:
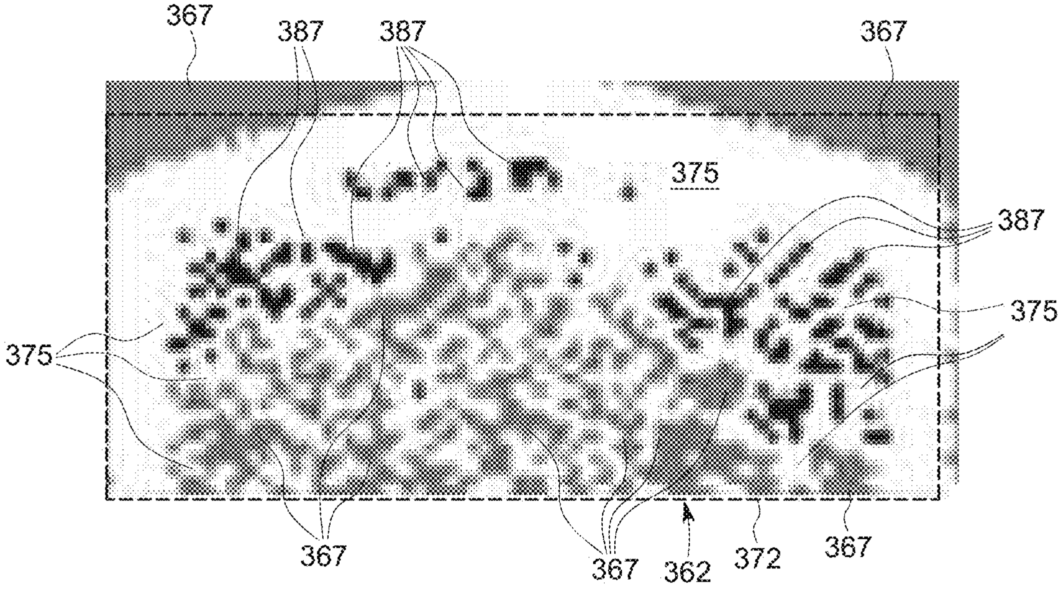
FIG. 3D is a diagram showing a display of a 2D height map mask for the coarse box point cloud of FIG. 3C.
Figure 3E:
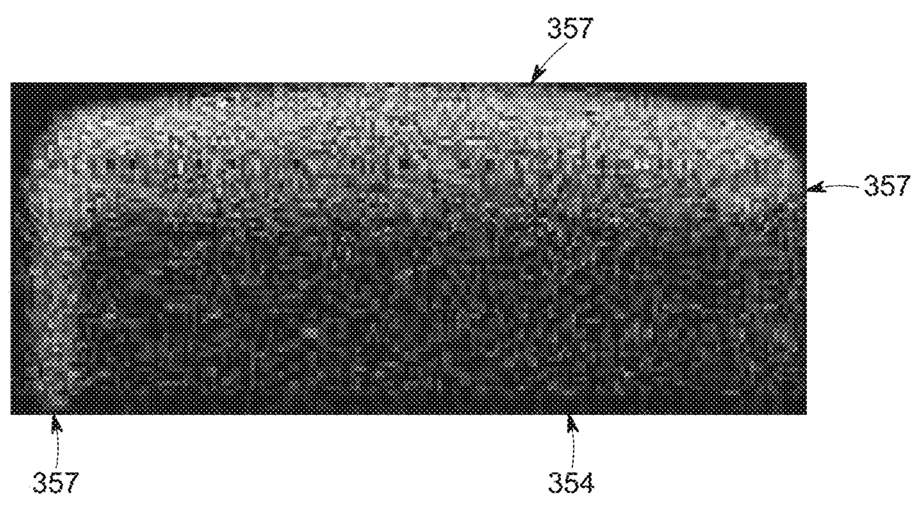
FIG. 3E is a diagram showing a display of a (coarse box) point cloud acquired by the arrangement of FIG. 1 for the side face of an exemplary cuboidal object.
Figure 3F:
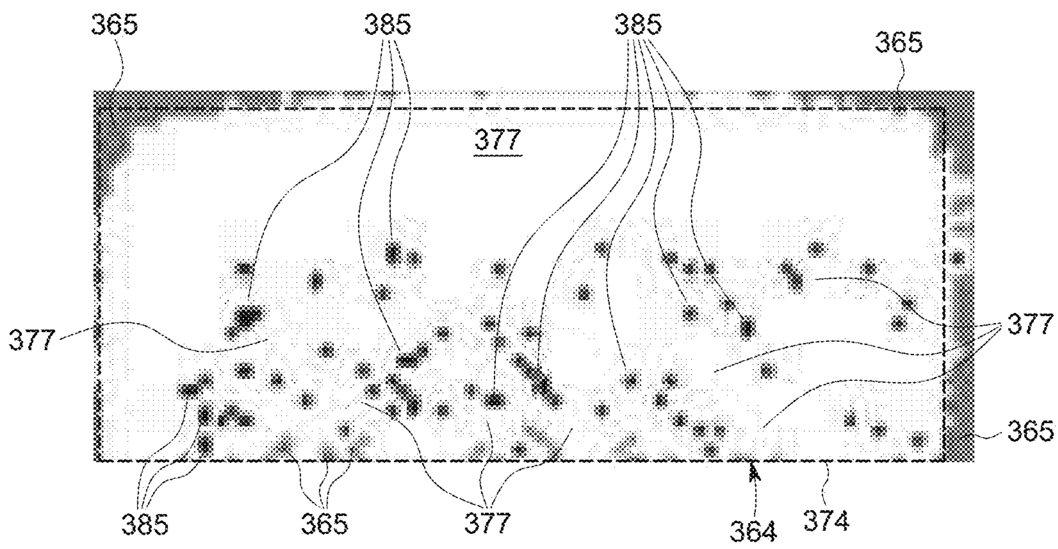
FIG. 3F is a diagram showing a display of a 2D height map mask for the coarse box points of FIG. 3E.

Reference is now made to the box shape estimation procedure 300 shown in FIG. 3. In estimating the object's canonical shape, the dimensions of a cuboidal object/box can be given by a user or other modality—for example stored box dimensions—or estimated via vision system tool computations—for example edge finding, blob analysis, etc. This given or estimated coarse box information is input to the procedure 300 in step 310, which then estimates (step 311) an initial box using identified bounding lines in 2D projection mask images. More particularly, in step 312, points within the coarse box are collected and these points are then projected along three orthogonal directions, for example, respectively looking from the top, front and left of the box to create a 2D height map along each dimension of the coarse box. In this manner three height maps (e.g. top view, front view and left view).

Then, in step 314, the procedure 300 generates a mask image for each height map with (e.g.) pixel values 1 and 0, respectively, indicating an occupied or missing pixel. Mask pixels can be classified into two categories: face pixel and non-face pixel. Reference is now made to FIGS. 3A-3F that show display point cloud images of points within the coarse box top 350 (FIG. 3A), front 352 (FIG. 3C) and side 354 (FIG. 3E) faces and respective height map mask images for the top 360 (FIG. 3B), front 362 (FIG. 3D) and side 364 (FIG. 3F) and identified bounding lines 370, 372 and 374, respectively, viewed/imaged from three orthogonal directions. Note that coarse box edges are represented by lighter shaded pixels 353, 355 and 357. In the mask images (FIGS. 3B, 3D and 3F) non-face pixels are indicated by grey pixels 363, 365 and 367, respectively, and include (a) missing pixels directly or indirectly (through region-growing) connected to image border, and (b) occupied pixels in small groups that are near image border. Face pixels in the mask images (FIGS. 3B, 3D and 3F) are indicated as bright pixels 373, 375 and 377, respectively, and include (a) occupied pixels belonging to a large blob, and (b) missing pixels surrounded by occupied pixels of large blob (dark pixels 383, 385 and 387 in the mask images of FIGS. 3B, 3D and 3F, respectively). For each mask, the procedure 300 then identifies four bounding positions by analyzing the distribution of the counts of face pixels respectively along the image X and Y directions (indicated by above-described dashed lines 370, 372 and 374 in the mask images of FIGS. 3B, 3D and 3F, respectively).

Each bounding line 370, 372 and 374 in a respective mask image corresponds to a plane in the 3D space. In total, there are (e.g.) 12 planes generated from three mask images. A box can be constructed by using these planes (step 316). This is the initial (refined) box estimated using 2D projection image information. To estimate a face of the initial box (e.g., top), the bounding line which is parallel to and closest to the face (e.g., top) among the four lines derived from each of the two parallel-view masks is identified (e.g., front view mask and left view mask). Then the one between the two identified bounding lines is selected—whichever is closer to the center of the coarse box and its corresponding plane is used to determine the face in the initial box.

Figure 4A:
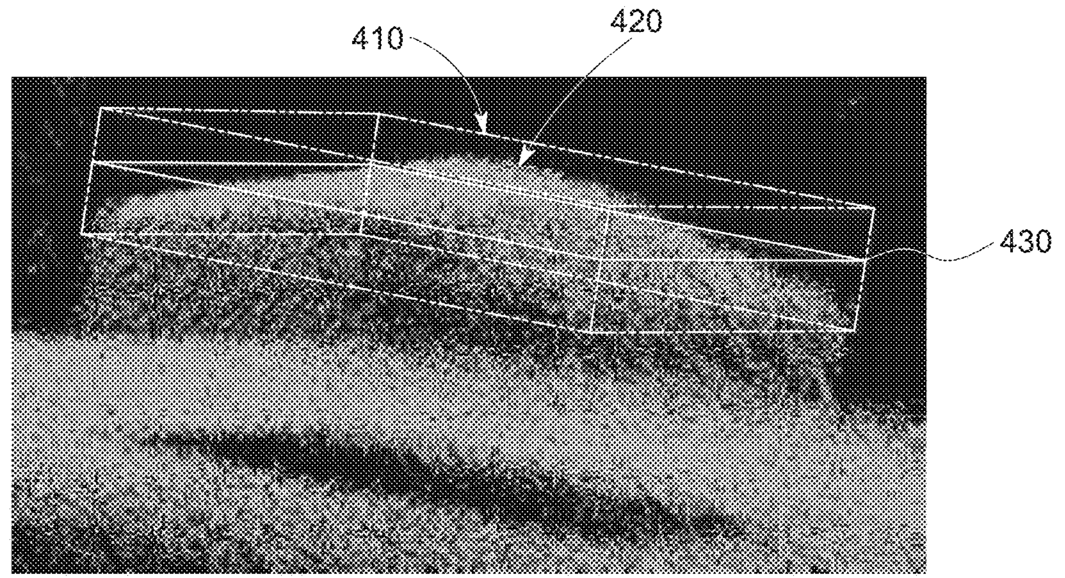
FIG. 4A is a diagram showing a display of a point cloud of an exemplary face-specific box analysed to determine face thickness according to the procedure of FIG. 3.
Figure 4B:
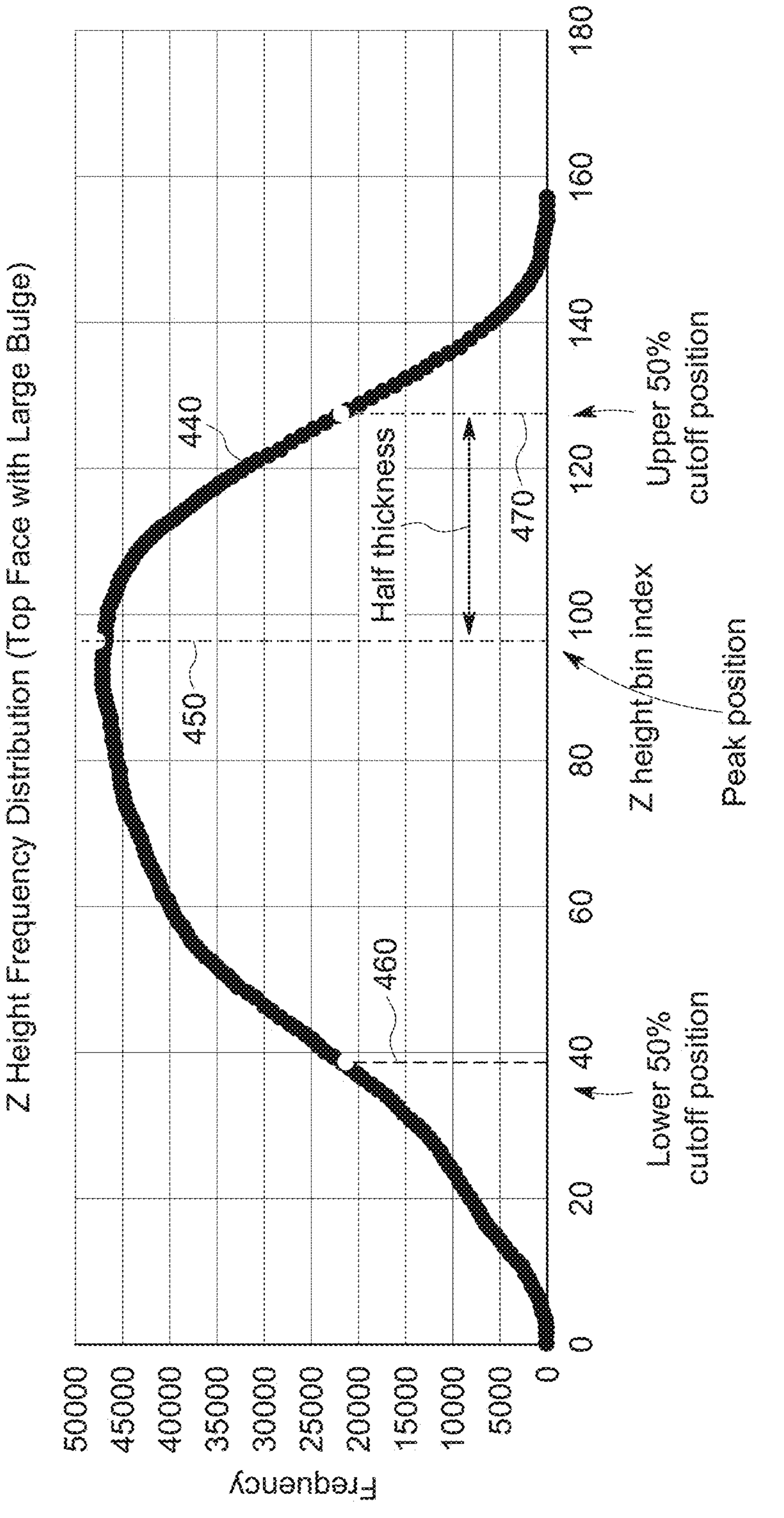
FIG. 4B is a histogram used for determining face thickness for the box of FIG. 4A, featuring peak and thickness length.

In step 320 of the procedure 300, the initial box's top, front, back, left and right faces are then refined. In step 322, for each face, that face's thickness is estimated. This entails collecting the points (called face points) that are on or close to the face by defining a face-specific box. An exemplary face-specific box 410 is shown with respect to the points 420 in FIG. 4A. With reference also to FIG. 4B, the point density (frequency) distribution (curve 440) along the face's normal direction is then estimated using a histogram of face point distances relative to the face, and the peak position 450 is identified as the point at which the frequency is the maximum.

The thickness of the face can be defined by various metrics—for example, a location on each side of the face where the frequency and/or density of points falls below a certain threshold. In an exemplary embodiment, the thickness of the face is defined as twice the smaller distance from the peak position to the two cutoff positions 460 and 470, at which the frequency becomes greater than or equal to a certain preset fraction (e.g., 50%) of the peak frequency when searching respectively from the first and last bin of the distribution.

Figure 5A:
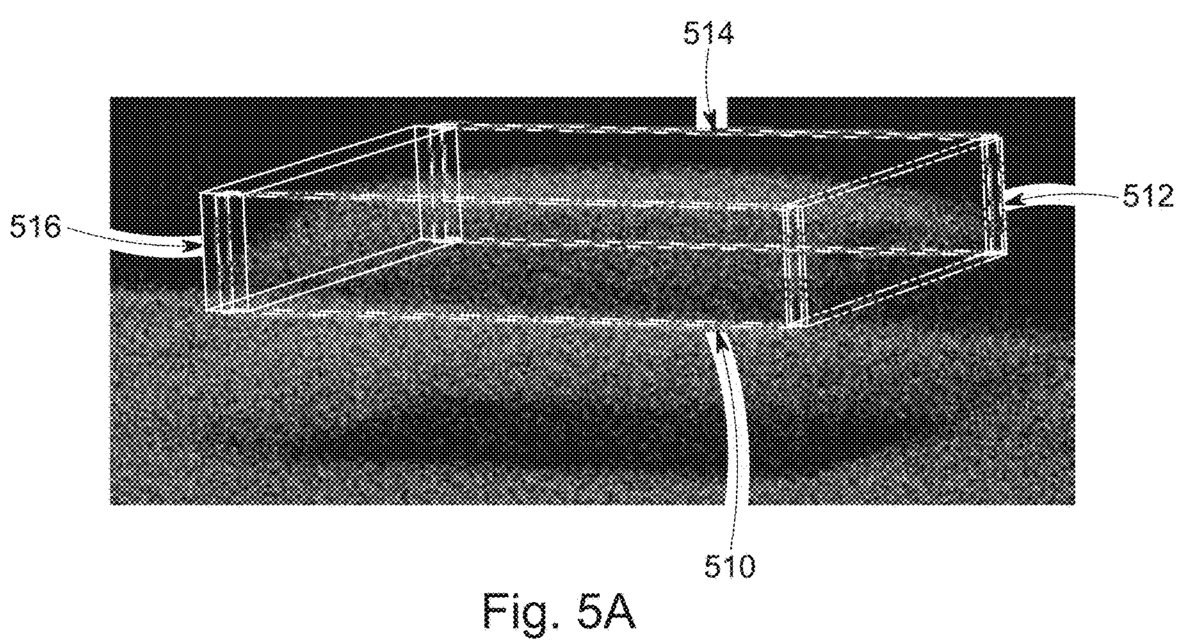
FIG. 5A is a diagram showing a display of a point cloud of an exemplary face-specific box showing neighbor face boxes, for use in the refinement step of the procedure of FIG. 3.
Figure 5B:
FIG. 5B is a diagram showing a display of a point cloud of an exemplary face-specific box showing boundary points between a left face and top face thereof, for use in the refinement step of the procedure of FIG. 3.
Figure 5C:
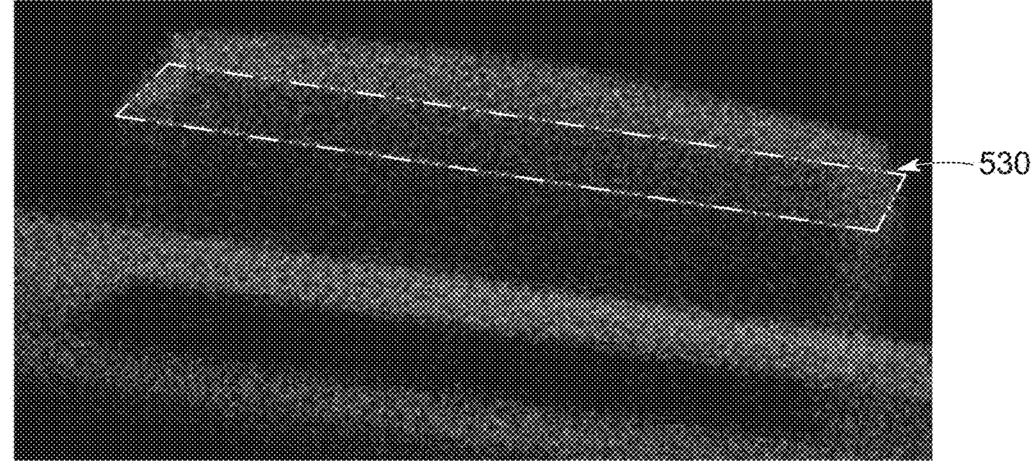
FIG. 5C is a diagram showing a display of a point cloud of an exemplary face-specific box showing boundary points of a face and a fitted plane, for use in the refinement step of the procedure of FIG. 3.

As shown in FIG. 5C, each face is refined by fitting a robust plane 530 using the boundary points identified for each face thickness.

The procedure constructs four local boxes 510, 512, 514 and 516 (FIG. 5A), each corresponding to one adjacent face (called neighbor face) of the current face (430 in FIG. 4A) under consideration (called current face). Each neighbor's face-specific box 510, 512 and 514 is defined using the obtained thickness (location and thickness length) of the corresponding face. Note that in various illustrations herein (e.g. FIGS. 4A and 5A-6D, local boxes and/or faces are differentiated using different types of line details—i.e. solid lines (____) dashed lines ( _ _ _ ), and long-short dashed lines ( __ _ _ __ ).

As shown in FIG. 5B, and according to step 324, the procedure then extracts representative points of the boundary/edge between current face and each neighbor face. Then in step 326, the procedure fits a plane 530 (FIG. 5C) by applying robust computation techniques, which should be clear to those of skill, approaches to all the representative boundary points of current face and use the plane to refine current face.

In step 330, the procedure 300 then derives a 3D box shape using the refined faces from step 320. It is contemplated that a result box can be derived based upon various techniques, which that should be clear to those of skill. In an exemplary embodiment the result is obtained by the following procedure.

In step 332, the result box is reconstructed according to the refined face positions in 3D space, i.e., correcting the coarse box's offset and size while retaining the rotation of coarse box pose (rotation, position, etc.). Then, in step 334, the result box's rotation is corrected if any face has a larger tilt than a preset (user-input or automatically provided threshold) angle (e.g., 10 degrees) from the corresponding face of the coarse box. The rotation correction includes identification of the defect-free refined faces whose face point distance residues are expected to be small. The best rotation transform is then estimated, which leads to the minimum error when the unit normal directions of the defect-free refined faces are mapped to that of coarse box through the rotation transform.

The result, consisting of an estimation of accurate box shape with corrected pose and dimensions, is output via the result process(or) 146 in step 340. In some embodiments, the result can be displayed to a user (e.g., via display or touchscreen 152). These results can be used for a variety of utilization processes including, but not limited to, quality control, part rejection, logistics/sorting, etc.

C. Exemplary Cuboidal Objects/Boxes Dimensioned

Figure 6A:
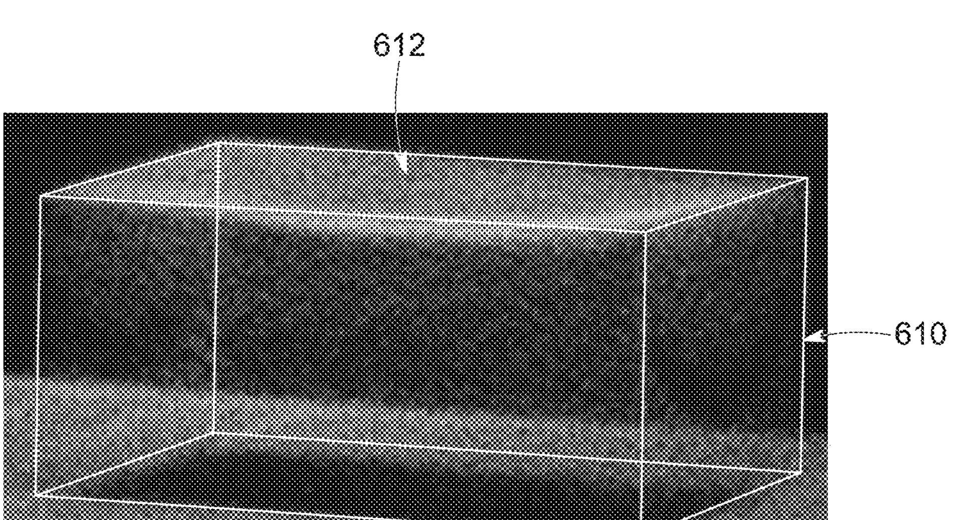
FIG. 6A is a diagram showing a display of a point cloud of an exemplary cuboidal object/box showing accurate canonical shape estimation results using the procedure of FIG. 3, in which the top includes a dent.
Figure 6B:
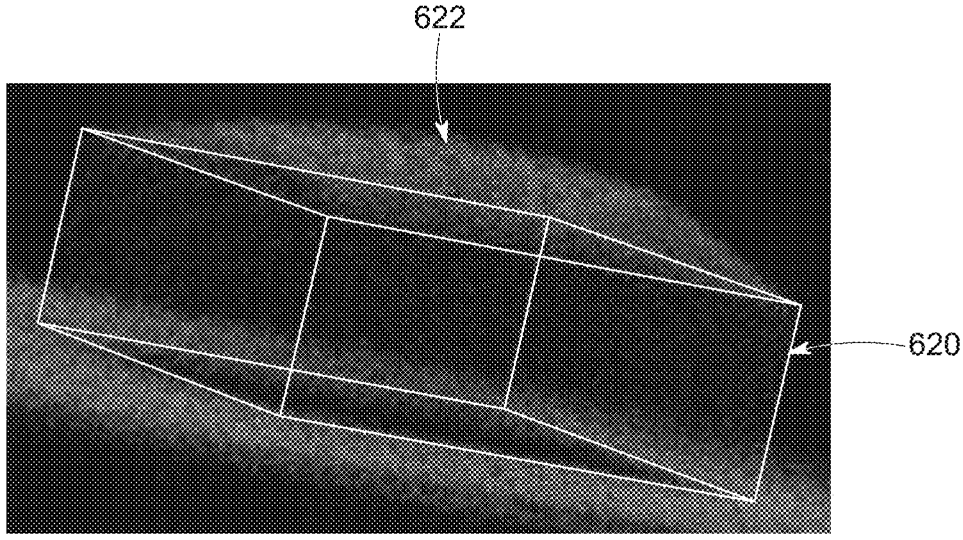
FIG. 6B is a diagram showing a display of a point cloud of an exemplary cuboidal object/box showing accurate canonical shape estimation results using the procedure of FIG. 3, in which the top includes a bulge.
Figure 6C:
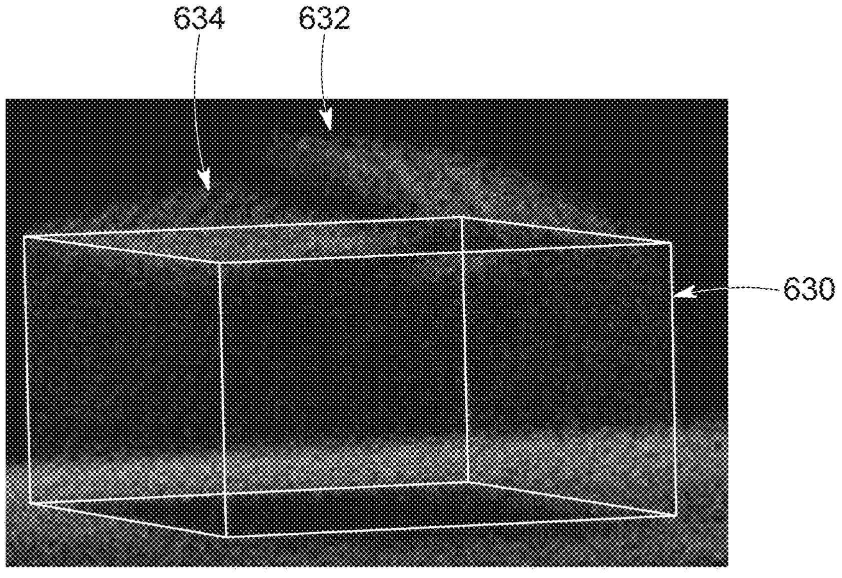
FIG. 6C is a diagram showing a display of a point cloud of an exemplary cuboidal object/box showing accurate canonical shape estimation results using the procedure of FIG. 3, in which the top includes an open flap.
Figure 6D:
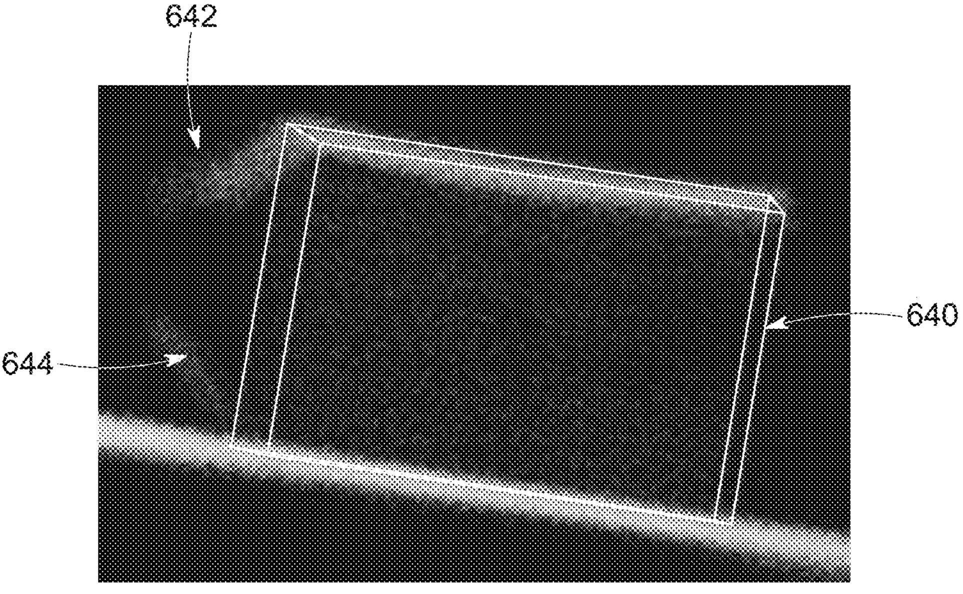
FIG. 6D is a diagram showing a display of a point cloud of an exemplary cuboidal object/box showing accurate canonical shape estimation results using the procedure of FIG. 3, in which the side includes open flap(s)
Figure 6E:
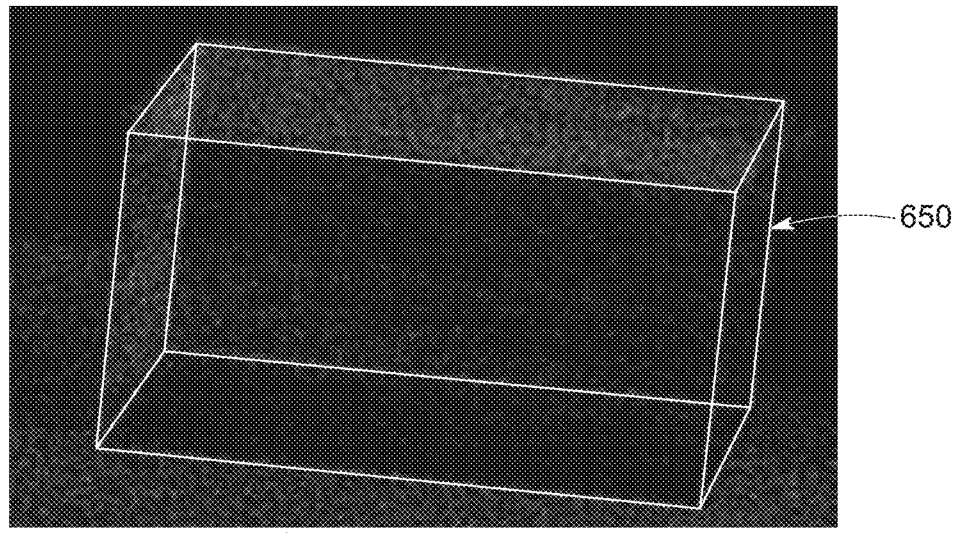
FIG. 6E is a diagram showing a display of a point cloud of an exemplary cuboidal object/box showing accurate canonical shape estimation results using the procedure of FIG. 3, in which no substantial defects are present.

Notably, the system and method herein can estimate an accurate cuboidal object/box pose and dimensions in the presence of defects. FIGS. 6A-6E are images of point clouds and box characteristics for various boxes with associated characteristics that can affect the estimation process. FIG. 6A shows a box boundary 610, defined around a box having a dented or caved-in top 612. Likewise, FIG. 6B shows an estimated box boundary 620 defined for a box having a bulged top 622. An accurately estimated box shape 630 is provided where the top face includes two open flaps 632 and 634 (FIG. 6C). Similarly, box dimensions 640 are outlined where the left side of the box includes open flaps (FIG. 6D). Finally, FIG. 6E shows a relatively defect free box point cloud and associated dimension boundaries 650.

III. Generalized Operational Procedure

Figure 7:
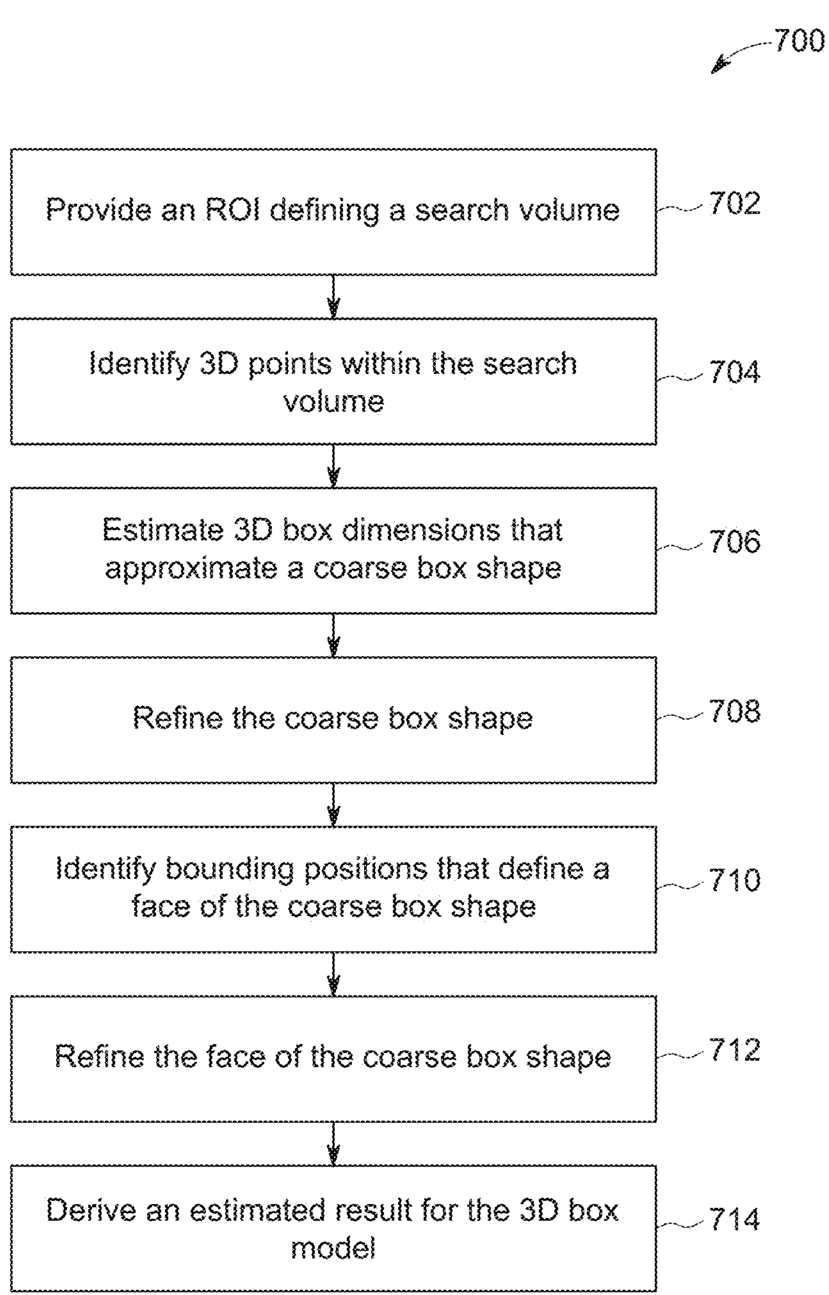
FIG. 7 is a flow diagram showing an operational procedure for the system and method herein.

Reference is made to FIG. 7, which shows a basic operational procedure 700 carried out by the vision system process(or) 140 and associated tools 142, estimator 144 and results process(or) 146 according to an exemplary embodiment herein, and as described above. In step 702, the procedure 700 receives an ROI based upon point cloud or other approximations so as to define a search volume with respect to a cuboidal object/box. Then, in step 704, the procedure 700 identifies 3D points within the defined search volume. Based upon the identified points, in step 706, the procedure 700 estimates a coarse box shape. The coarse box shape is then refined in step 708. This refined coarse box shape is used by the procedure 700 in step 710 to identify bounding positions that define a given face of the coarse box shape. Once identified, the procedure 700 then refines the face of the coarse box shape in step 712. The refined face(s) is/are used to derive an estimated result for the 3D box model in step 714, and that result can then be used by further analysis and handling processes.

IV. Conclusion

It should be clear that the above-described system and method overcomes disadvantages of prior techniques in which estimating canonical shape of cuboidal objects (a) employs blob tool result bounding box that is sensitive to extreme points, (b) boundary statistics analysis on top face points can be inaccurate due to defects, and/or (c) the top face four-corner based approach requires the accurate corner positions and it is sensitive to corner deformation and open flap. Additionally, the system and method outperform prior dimensioning techniques because it considers the information of five extracted faces, rather than the top face exclusively, as performed by prior techniques.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. A system for estimating a three-dimensional (3D) box model of a generally cuboidal object imaged by a 3D vision system, that provides a 3D image having 3D points representing imaged surfaces of the cuboidal object to at least one processor, comprising:

an input process that provides, to the at least one processor, a region of interest (ROI) defining a search volume within the 3D image;

an identification process that identifies the 3D points that are within the search volume;

a coarse estimation process that estimates, based on the identified 3D points, 3D box dimensions that approximate a coarse box shape of the cuboidal object; and a refinement process that refines the coarse box shape to derive an estimated result for the 3D box model by, for an imaged surface of the imaged surfaces:

determining a projection two-dimensional (2D) height map and defining at least one of face pixels or non-face pixels associated with the imaged surface, identifying bounding positions that define a face of the coarse box shape based upon a distribution of the at least one of face pixels or non-face pixels, refining the face of the coarse box shape by determining an associated face thickness, and deriving the estimated result for the 3D box model including the refined face.

2. The system as set forth in claim 1, wherein the coarse estimation process is adapted to estimate a thickness of each of a plurality of imaged faces corresponding to the 3D box dimensions by analyzing statistics of a distribution of the 3D points based on the 3D box dimensions that correspond to each of the plurality of imaged faces.

3. The system as set forth in claim 2, wherein the statistics are based upon a 3D point density distribution along a normal direction to each of the plurality of imaged faces.

4. The system as set forth in claim 3, wherein the statistics are further based upon a histogram of face point distances relative to each of the plurality of imaged faces, and wherein the thickness is a predetermined distance on each of opposing sides of a histogram peak position, the histogram peak position being a location at which the 3D point density distribution is a maximum.

5. The system as set forth in claim 2, wherein the refinement process is adapted to identify boundary 3D points corresponding to the 3D points located between adjacent faces of the plurality of imaged faces.

6. The system as set forth in claim 5, wherein the refinement process is adapted to compute a face plane for each of the plurality of imaged faces by fitting a 3D robust plane using the identified boundary 3D points.

7. The system as set forth in claim 6, wherein the face plane is computed based upon the thickness estimates of neighboring imaged faces.

8. The system as set forth in claim 1, further comprising a result process that is adapted to estimate a 3D box shape based upon the 3D box dimensions that correspond to a plurality of imaged faces with face position and rotation correction.

9. The system as set forth in claim 8, wherein the result process is adapted to perform rotation correction based upon identification of a face in the estimated result that defines a tilt angle that is greater than a preset threshold angle.

10. A method for estimating a three-dimensional (3D) box model of a generally cuboidal object imaged by a 3D vision system that provides a 3D image having 3D points representing imaged surfaces of the cuboidal object, the method comprising the steps of:

providing a region of interest (ROI) in which the ROI defines a search volume within the 3D image;

identifying the 3D points that are within the search volume;

estimating 3D box dimensions that approximate a coarse box shape of the cuboidal object based upon the identified 3D points;

refining the coarse box shape by determining a projection two-dimensional (2D) height map associated with an imaged surface of the imaged surfaces, and defining at least one of face pixels or non-face pixels associated with the imaged surface;

identifying bounding positions that define a face of the coarse box shape based upon a distribution of the at least one of face pixels or non-face pixels;

refining the face of the coarse box shape by determining an associated face thickness; and deriving an estimated result for the 3D box model including the refined face.

11. The method as set forth in claim 10, wherein the step of estimating determines an estimated thickness of each of a plurality of imaged faces corresponding to the 3D box dimensions by analyzing statistics of a distribution of the 3D points based on the 3D box dimensions that correspond to each of the plurality of imaged faces.

12. The method as set forth in claim 11, further comprising, basing the statistics upon a 3D point density distribution along a normal direction to each of the plurality of imaged faces.

13. The method as set forth in claim 12, further comprising, basing the statistics upon a histogram of face point distances relative to each of the plurality of imaged faces, and determining the thickness based upon a predetermined distance on each of opposing sides of a histogram peak position, the histogram peak position being a location at which the 3D point density distribution is a maximum.

14. The method as set forth in claim 11, wherein the step of refining identifies boundary 3D points corresponding to the 3D points located between adjacent faces of the plurality of imaged faces.

15. The method as set forth in claim 14, wherein the step of refining comprises computing a face plane for each of the plurality of imaged faces by fitting a 3D robust plane using the identified boundary 3D points.

16. The method as set forth in claim 15, wherein the step of computing the face plane is based upon the thickness estimate of neighboring imaged faces.

17. The method as set forth in claim 10, further comprising, estimating a 3D box shape based upon the 3D box dimensions that correspond to a plurality of imaged faces with face position and rotation correction.

18. The method as set forth in claim 17, further comprising, correcting rotation of the estimated result based upon identification of a face in the estimated result that defines a tilt angle that is greater than a preset threshold angle.

19. A non-transitory computer readable medium comprising program instructions that, when executed, cause at least one processor to perform:

receiving, by the at least one processor, a three-dimensional (3D) image of a generally cuboidal object, the 3D image having 3D points representing imaged surfaces of the cuboidal object;

receiving, by the at least one processor, a region of interest (ROI) in which the ROI defines a search volume within the 3D image;

identifying the 3D points that are within the search volume;

estimating 3D box dimensions that approximate a coarse box shape of the cuboidal object based upon the identified 3D points;

refining the coarse box shape by determining a projection two-dimensional (2D) height map associated with an imaged surface of the imaged surfaces, and defining at least one of face pixels or non-face pixels associated with the imaged surface;

identifying bounding positions that define a face of the coarse box shape based upon a distribution of the at least one of face pixels or non-face pixels;

refining the face of the coarse box shape by determining an associated face thickness; and deriving an estimated result for the 3D box model including the refined face.

20. The non-transitory computer readable medium as set forth in claim 19, further comprising program instructions that, when executed, cause the at least one processor to determine an estimated thickness of each of a plurality of imaged faces corresponding to the 3D box dimensions by analyzing statistics of a distribution of the 3D points based on the 3D box dimensions that correspond to each of the plurality of imaged faces.

* * * * *